April 24, 1962 J. P. JONES 3,030,697

METHOD OF FORMING MAGNETIC CORE ELEMENTS

Filed Nov. 3, 1955

INVENTOR.
JOHN PAUL JONES
BY
Harries A. Mumma Jr.
ATTORNEY

United States Patent Office 3,030,697

Patented Apr. 24, 1962

3,030,697

METHOD OF FORMING MAGNETIC CORE ELEMENTS

John Paul Jones, Pottstown, Pa., assignor to Burroughs Corporation, Detroit, Mich., a corporation of Michigan Filed Nov. 3, 1955, Ser. No. 544,743
4 Claims. (Cl. 29—155.57)

This invention relates to magnetic core elements of the type made up of a spirally wound strip or tape of a ferromagnetic material and to methods of forming such magnetic cores.

The formation of magnetic cores by winding tape on bobbins is known to the art. The unannealed tape is cut to the length required to obtain the desired number of laps, started on the bobbin, and wound, the last lap or end portion is spot-welded to the lap beneath, and the assembly is subjected to a recrystallization and grain-growth anneal to develop the desired magnetic properties, ordinarily at temperatures above 700° C. and frequently in the neighborhood of 1000° C. The bobbin can be of ceramic material to withstand annealing temperatures. Such a procedure and the resulting bobbin-wound core may be highly advantageous in some cases. Certain refinements of such procedures, affording unusually desirable properties in the resulting cores, are disclosed and claimed in the copending application of Victor V. Damiano for Letters Patent of the United States, Serial No. 478,994, filed December 31, 1954, now Patent 2,914,840, and assigned to the same assignee as is the present invention.

Nevertheless, the methods heretofore proposed for accomplishing the winding of such cores from magnetic tape, for anchoring the ends of the wound cores, and for enclosing, encapsulating, or otherwise protecting the finished cores, which may be wound of very thin and fragile strip material, under some circumstances gives rise to production difficulties and other problems arising from the handling of the materials and of the finished product.

It is an object of this invention, therefore, to provide a new and improved method of forming a magnetic core which avoids one or more of the disadvantages of the prior art methods.

It is another object of the invention to provide a new and improved method of forming a magnetic core which affords a relatively easy and inexpensive procedure for handling the thin strip material and which eliminates certain difficulties in the wniding and finishing of the core elements.

It is still another object of the invention to provide a method of forming magnetic core elements which are better adaptable to modern methods of automation.

In accordance with the invention, and first briefly described, the method of forming a magnetic core comprises winding a length of thin magnetic tape on a spindle in successive overlying laps to a predetermined outside diameter; placing the spindle within a non-magnetic retaining sleeve having a bore dimensioned to receive said spindle carrying said tape wound thereon; expanding the tape against the inner periphery of said sleeve; and withdrawing the spindle to leave the wound tape as a magnetic core in the sleeve.

For a better understanding of the present invention, together with other and further objects thereof, reference is had to the following description taken in connection with the accompanying drawing, and its scope will be pointed out in the appended claims.

Figure 1:
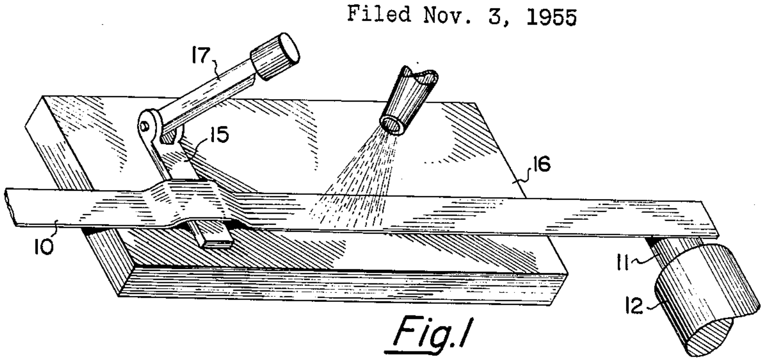
FIG. 1 is a perspective view showing the initial step in carrying out one embodiment of the method of the invention.

Referring now to the drawing illustrating the preferred embodiment of the invention, and first to FIG. 1, the magnetic tape 10 is shown ready to be wound on the properly dimensioned end 11 of an applicator spindle 12 in carrying out the method of forming a magnetic core in accordance with the invention. Preferably a refractory insulating material is applied in the form of a spray or painted-on layer to a length of the unannealed thin magnetic tape 10 before the tape is wound on the spindle. As disclosed and claimed in the aforementioned application Serial No. 478,994, this insulating material may be a liquid emulsion made by mixing oil and magnesium oxide. The insulating material may be applied in the form of small particles or droplets, as illustrated schematically in FIG. 1.

For the tape the choice of material depends on the properties desired in the wound core. Representative of the magnetic compositions useful for various applications are iron containing some silicon and the permalloys and molybdenum-bearing permalloy. The tape has the form of a thin strip, which for applications involving high frequencies or pulse wave forms may have a thickness of the order of 0.001 inch. A tape having a thickness of about 0.0002 inch can be handled by the method of the invention. Tape widths of ⅛ to ½ inch are customary for some applications, and the diameter of the end 11 of the applicator spindle may be, for example, of the order of ⅛ inch.

Figure 2:
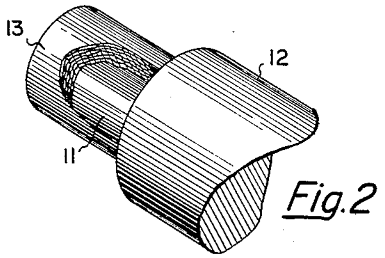
FIG. 2 is a perspective view, partly broken away, illustrating an intermediate step in forming a magnetic core in accordance with this embodiment of the invention.

The length of this thin magnetic tape 10 is wound on the spindle end 11 in successive overlying laps to a predetermined outside diameter by turning the spindle in one sense, for example clockwise as viewed in FIG. 1, to build up the wound structure. This structure is represented as 13 in the perspective view of FIG. 2, which is cut away to show the spindle end 11. By way of example, a representative core may have from about 5 to about 15 turns or laps in the wound structure.

Figure 3:
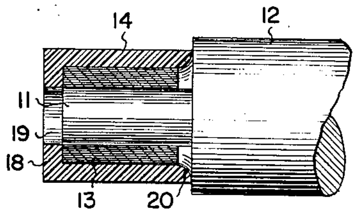
FIG. 3 is an elevation illustrating a succeeding step in this method, with magnetic core and retaining sleeve members shown in cross section.

The spindle, carrying the tape 13, next is placed within a refractory retaining sleeve 14, and is shown in that position in the sectionalized view of FIG. 3. The sleeve 14 has a bore dimensioned to receive the spindle carrying the tape wound thereon, preferably with a small clearance to facilitate insertion within the sleeve without disturbing or tearing the tape. The sleeve 14 may be of ceramic material, of a non-magnetic alloy such as stainless steel, or of other material capable of withstanding annealing temperatures, and the term "refractory" is used in this specification and in the appended claims as signifying the capability of resisting and withstandng annealing temperatures, in this case without impairment of the supporting and protecting function of the sleeve.

It is desirable to measure and cut the tape 10 to the length required for the predetermined dimensions of the wound structure before the winding is done. For this purpose a guide bar 15 is provided, as seen in FIG. 1, resting on a tape-supporting measuring base 16 and adjustable along the direction of the tape travel during winding. The bar 15 is set up initially to give the required measured length and is associated with a pivoted cutting blade 17 for severing the tape 10 at the proper point. When the measured length of tape has been wound into the structure shown in FIG. 2, it has the predetermined outside diameter so as to fit closely but without damage within the sleeve 14. A very small amount of adhesive material may be placed on the outermost end of the tape to prevent its unwinding before insertion into the sleeve 14, but the insulating material on the tape frequently exerts sufficient cementing action for this purpose.

The sleeve 14 is shown in FIG. 3 with an annular flange 18 extending inwardly on the left end portion of the sleeve and has an opening 19 for axial alignment with the open center of the core structure. The other end of the sleeve 14 preferably is outwardly flared internally to provide an entrance guide 20, which permits the wound tape to enter the sleeve without damage. The wound structure is inserted into the sleeve until it seats against the inner face of the flange 18. It may be desirable to wind the tape on the spindle end 11 so that the extreme end of the spindle can pass into the opening 19 for accurate alignment.

Figure 4:
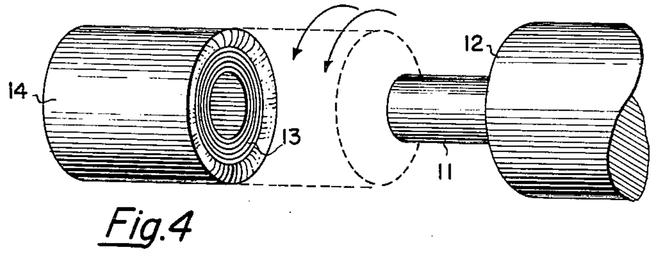
FIG. 4 is a perspective view illustrating schematically a succeeding step in the assembly of the elements.

The spindle now is withdrawn from the sleeve to leave the wound tape as a magnetic core in the sleeve. This withdrawal preferably is accomplished by giving the spindle 12 a back spin to unfurl the tape against the wall of the sleeve bore. As represented schematically in FIG. 4, the spindle is turned in the opposite, or counterclockwise, sense from that of the winding operation to the extent required to lap the tape against the bore in successive underlying laps and release the spindle. Any cement or other temporary means for preventing unwinding of the tape prior to insertion within the sleeve should be broken loose by this reverse spinning operation. Occasionally, it will be necessary to joggle the assembly to start the unwinding, and the apparatus used may be designed to do this. The tape preferably is wound in its cold-rolled state so that its springiness gives it a natural tendency to unwind. This tendency insures that the tape unfurls itself compactly, and only a small amount of unwinding motion may be necessary to cause the tape to unfurl and release the spindle. This same tendency to unwind will be seen to anchor the tape in place firmly within the sleeve 14.

The core then is annealed while so assembled within the sleeve, following the usual annealing techniques. Annealing is called for to develop the desired magnetic properties and also is desirable in view of the cold-working involved in forming the strip, in winding it into a core, or in both operations.

Figure 5:
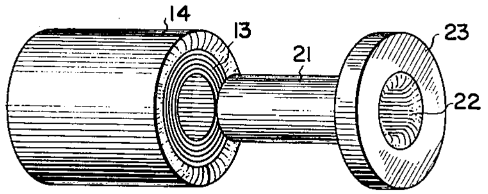
FIG. 5 is a similar perspective view showing a seal about to be inserted in the assembly thus produced.

A hollow protective member advantageously may be affixed within the core and sleeve assembly to seal the open end of the sleeve 14 with its contained core structure 13. For this purpose a bushing 21, illustrated in FIG. 5 ready for assembly and preferably of plastic or other non-magnetic material, is provided having a bore 22 of sufficient diameter to permit the conductors of the electrical windings to be passed therethrough. It is understood that the diameter of the spindle end 11 and the bore of the sleeve 14 are dimensioned initially to that end. The bushing 21 is formed with a peripheral flange 23 extending outwardly and having a diameter such as to close the open or guide end 20 of the sleeve 14. The bushing 21 preferably has sufficient elasticity so that it can be pushed into the core and sleeve assembly, as illustrated in cross section in FIG. 6, until the left surface of the flange 23 seats firmly against the end portion 20 of the sleeve 14 while the left end of the bushing proper is seated tightly within the flange 18 of the sleeve 14.

Thus a sealed magnetic core element is formed as a complete article of manufacture. The core is retained within a sleeve, as distinguished from the core elements heretofore fabricated by winding magnetic tape about a ceramic sleeve. Since any tendency of the tape to unwind makes the core more compact, it is no longer necessary to affix the outer end of the wound tape to the tape lying thereunder to prevent unwinding; the use, for example, of spot-welding techniques to hold the end of the tape down during the annealing operation and thereafter, with consequent deterioration of the magnetic properties of the uppermost lap of the core, thus is avioded.

Figure 6:
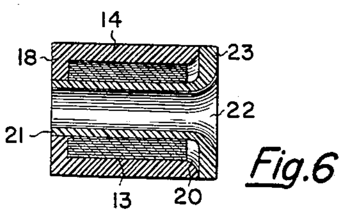
FIG. 6 is a longitudinal central sectional view of a completed core element.

Referring to FIG. 6, it will be seen that the method of the present invention provides a magnetic core element which is neat, compact, and sealed so that further enclosing or encapsulating operations are unnecessary. This element comprises the sleeve 14 of non-magnetic material having the annular flange 18 extending inwardly on one end. The core 13, formed by windings of magnetic tape laid against the inner surface of the sleeve in successive underlying laps, is seated at one end against the sleeve flange 18. The element also comprises the bushing 21 of non-magnetic material having its body part adjacent to the innermost lap of the core 13 and positioned at one end contiguous to the sleeve flange 18. This bushing also has the aforementioned peripheral flange 23, which is seated against the sleeve at the other end to seal the core. The core element, per se, is described and claimed in applicant's co-pending divisional application Serial No. 712,432, filed January 31, 1958, entitled "Magnetic Core Elements" and assigned to the same assignee as the present invention.

While there has been described what at present considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. The method of forming a magnetic core, comprising: winding a length of unannealed thin magnetic tape on a spindle by turning said spindle in one sense to build up thereon successive overlying laps of said tape to a predetermined outside diameter; inserting said spindle coaxially within a refractory retaining sleeve having a bore dimensioned to receive said spindle carrying said tape wound thereon; turning said spindle in the opposite sense to the extent required to lay said tape against the walls of said bore in successive underlying laps and release said spindle, removing said spindle from said sleeve leaving said wound tape as a magnetic core within said sleeve; and annealing said core assembled in said sleeve at a temperature insufficient to destroy said sleeve.

2. The method of forming a magnetic core, comprising: winding a length of unannealed thin magnetic tape on a spindle by turning said spindle in one sense to build up thereon successive overlying laps of said tape to a predetermined outside diameter; inserting said spindle substantially coaxially within a refractory retaining sleeve having a bore dimensioned to receive said spindle carrying said tape wound thereon; turning said spindle in the opposite sense to the extent required to lay said tape against said bore in successive underlying laps and release said spindle, withdrawing said spindle from said sleeve leaving said wound tape as a magnetic core within said sleeve; annealing said core assembled in said sleeve at a temperature insufficient to destroy said sleeve; and finally coaxially inserting a hollow protective member within said core and sleeve assembly and affixing it to said sleeve.

3. The method of forming a magnetic core, comprising: applying refractory electrical insulating material to one side of a length of unannealed thin magnetic tape; winding said length of tape on a spindle by turning said spindle in one sense to build up thereon successive mutually insulated overlying laps of said tape to a predetermined outside diameter; inserting said spindle substantially coaxially within a refractory retaining sleeve having a bore dimensioned to receive said spindle carrying said tape wound thereon; turning said spindle in the opposite sense to the extent required to lay said tape against said bore in successive underlying laps and release said spindle, withdrawing said spindle from said sleeve leaving said wound tape as a magnetic core within said sleeve; annealing said core assembled in said sleeve at a temperature insufficient to destroy said sleeve; and finally coaxially inserting a hollow protective member within said core and sleeve assembly and affixing it to said sleeve.

4. The method of forming a magnetic core element, comprising: winding a length of unannealed thin magnetic tape on a spindle in successively overlying laps to a predetermined outside diameter; inserting said spindle and wound tape substantially coaxially within an enclosing sleeve of non-magnetic material, the bore of which is of greater diameter than the outer diameter of said wound tape on said spindle; expanding the wraps of said wound tape from said spindle and against the inner walls of said enclosing sleeve in successively underlying laps; withdrawing said spindle from said wound tape and said enclosing sleeve leaving said wound tape as a magnetic core in said enclosing sleeve; sealing said wound tape within said enclosing sleeve with a sleeve-like member of non-magnetic material extending substantially coaxially through the bore of said core and with its ends sealed to the ends of said enclosing sleeve; and annealing said core at a temperature insufficient to destroy said enclosing sleeve and said sealing material.

References Cited in the file of this patent

UNITED STATES PATENTS

| | | |
|---|---|---|
| 366,408 | Lange | July 12, 1887 |
| 1,586,889 | Elmen | June 1, 1926 |
| 1,706,721 | Weyandt et al. | Mar. 26, 1929 |
| 1,843,677 | Indergand | Feb. 2, 1932 |
| 1,902,491 | Dahl | Mar. 21, 1933 |
| 2,198,644 | Wettengel | Apr. 30, 1940 |
| 2,246,239 | Brand | June 17, 1941 |
| 2,568,310 | Wiffen | Sept. 18, 1951 |
| 2,696,335 | Fies | Dec. 7, 1954 |
| 2,703,392 | Rex | Mar. 1, 1955 |
| 2,731,183 | Shaw | Jan. 17, 1956 |
| 2,778,908 | Altieri | Jan. 22, 1957 |
| 2,833,027 | Foster | May 6, 1958 |
| 2,914,840 | Damiano | Dec. 1, 1959 |